Aug. 7, 1962  B. F. BREGI ETAL  3,048,066
GEAR ROLLING APPARATUS
Filed Nov. 3, 1958  3 Sheets-Sheet 1

INVENTORS
BENJAMIN F. BREGI
THOMAS S. GATES
BY
Whitemore, Hulbert & Belknap
ATTORNEYS Aug. 7, 1962   B. F. BREGI ETAL   3,048,066
GEAR ROLLING APPARATUS Filed Nov. 3, 1958   3 Sheets-Sheet 2

INVENTORS
BENJAMIN F. BREGI
THOMAS S. GATES
BY
*Whittemore, Hulbert & Belknap*
ATTORNEYS Aug. 7, 1962 B. F. BREGI ETAL 3,048,066
GEAR ROLLING APPARATUS Filed Nov. 3, 1958 3 Sheets-Sheet 3

INVENTORS
BENJAMIN F. BREGI
THOMAS S. GATES
BY
*Whittemore, Hulbert & Belknap*
ATTORNEYS United States Patent Office 3,048,066
Patented Aug. 7, 1962

3,048,066
GEAR ROLLING APPARATUS
Benjamin F. Bregi, Grosse Pointe, and Thomas S. Gates, Grosse Pointe Woods, Mich., assignors to National Broach & Machine Company, Detroit, Mich., a corporation of Michigan
Filed Nov. 3, 1958, Ser. No. 771,596
4 Claims. (Cl. 80—16)

This invention pertains to a gear rolling apparatus having a plurality of gear forming rolls which are rotatable about relatively spaced and inclined axes and engage a gear workpiece therebetween.

It is an essential object of this invention to provide a gear forming apparatus having a multiplicity of gear forming members rotatable on axes crossed in space with each member having a shaft fixed thereto along the member axis and with each shaft having a gear fixed thereto engageable with a common master or driving gear.

Another object is to provide such an apparatus with means for individually adjusting the gear forming members circumferentially and axially relative one another.

A further object is to provide such apparatus where the shafts are individually rotatable in a non rotatable drum with the common master or driving gear and the workpiece being driven coaxially.

It is a further object to provide a gear forming apparatus having a plurality of gear forming rolls rotatable about relatively spaced and inclined axes with each member having a shaft fixed thereto and extending in the direction of the axis and with each shaft rotatably mounted in a revolving drum and with means for axially and rotatively advancing a gear workpiece between the gear forming members in a manner corresponding to the helix angle to be formed on said workpiece.

These and other objects will become more apparent when preferred embodiments of my invention are considered in connection with the drawings.

Figure 1:
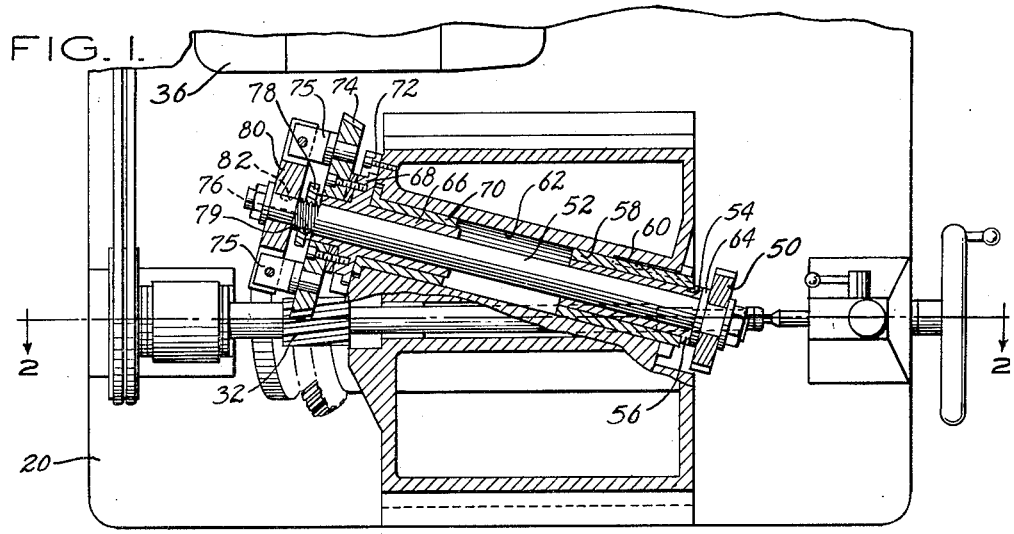
FIGURE 1 is a partial sectioned plan view of a first embodiment having a non rotatable drum.
Figure 2:
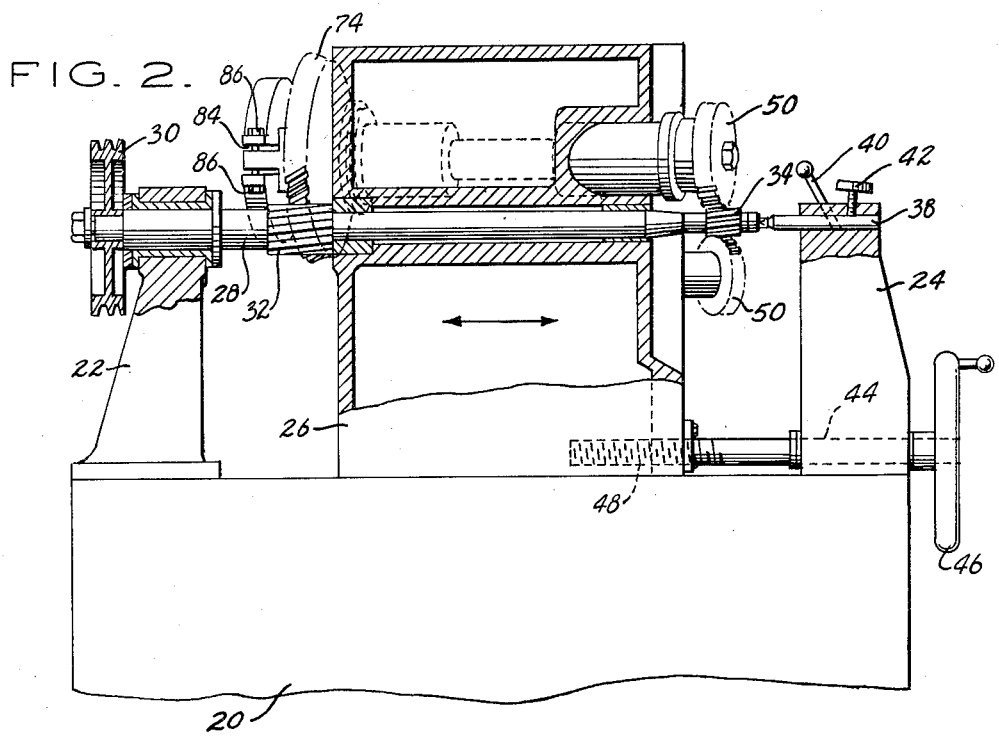
FIGURE 2 is a partial sectioned view taken along a line 2—2 of FIGURE 1.
Figure 3:
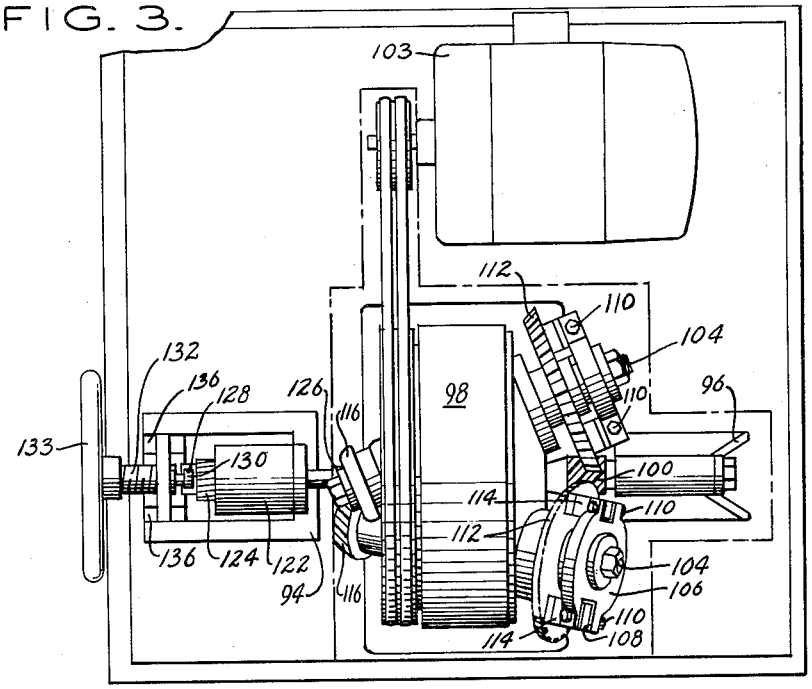
FIGURE 3 is a plan view of a second embodiment of this invention wherein the shaft carrying drum is rotatable.
Figure 4:
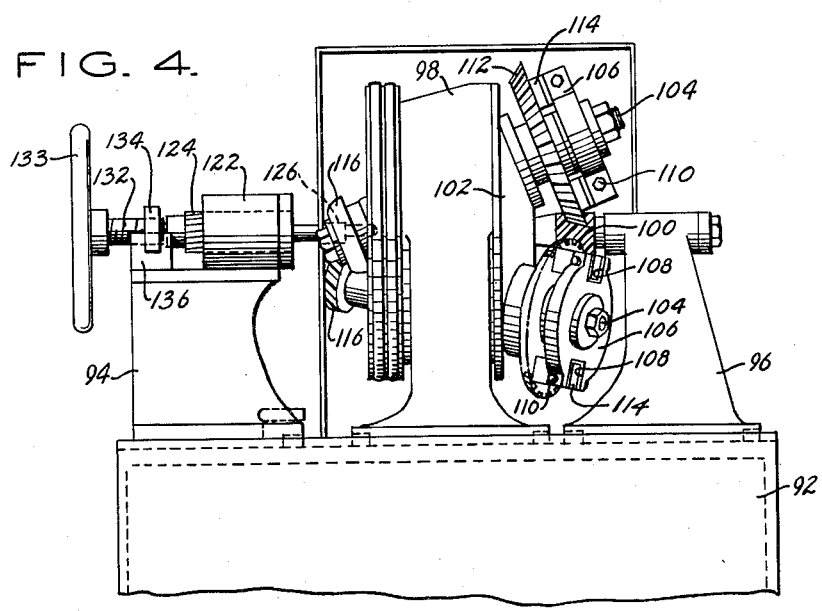
FIGURE 4 is an elevational view of the embodiment shown in FIGURE 3.
Figure 5:
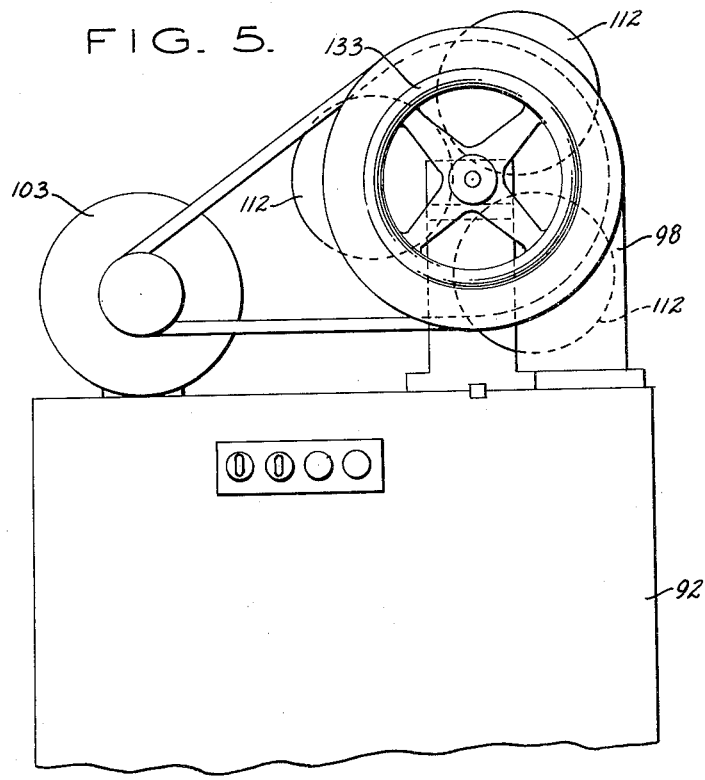
FIGURE 5 is an end elevation taken from the direction of arrow 5 in FIGURE 3.
Figure 6:
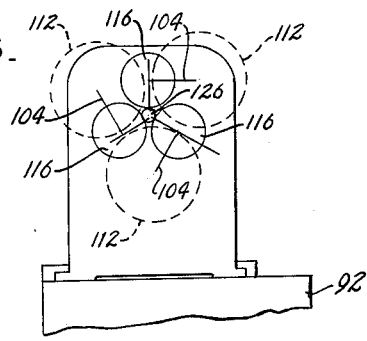
FIGURE 6 is a schematic end elevation of the gear forming rolls engaging a gear workpiece.

In the drawings in FIGURES 1 and 2 is shown a first preferred embodiment of my invention. In this embodiment there is a base 20 which supports, in fixed relation at either end, stands 22 and 24 and slidably supports for longitudinal movement therealong drum 26. Journaled for rotation in stand 22 and drum 26 is a power shaft 28 which has removably secured thereto a pulley 30, a master or driving gear 32 and a workpiece 34. Pulley 30 is belt driven from motor 36 and imparts rotation to shaft 28 and attached master gear 32 and workpiece 34. Mounted for axial movement in stand 24 is spindle 38 which is engageable with an end of power shaft 28 and is movable, in a conventional manner, by control rod 40 to an operative position which can be secured by locking screw 42.

Rotatably mounted in stand 24 is a shaft 44 which has secured to one end thereof a hand wheel 46 and at the other end 48 is threadedly engaged with a lower portion of drum 26 so that on rotation of wheel 46 the drum 26 will be moved along base 20.

Three gear forming rolls 50, each of which has gear forming teeth, are removably secured to their respective shafts 52 which are spaced from and inclined to one another and are rotatably mounted in drum 26. Frictionally fitted to each shaft 52 adjacent gear roll 50 is a sleeve 54 having a shoulder 56 formed at an end thereof which abuts a bearing 58, keyed at 60 to a shaftway 62 formed in drum 26. Roll 50 is separated from sleeve 54 by means of a spacer washer 64 which is replaceable with a washer having a different thickness to vary the axial position of roll 50 along shaft 52. Frictionally fitted to the other end of shaft 52 is a sleeve 66 rotatably journaled in bearing 70 and having shoulder 68 which is axially restrained by drum mounted collar 72. Bolted to shoulder 68 is a gear wheel 74 having conical involute teeth which are enmeshed with the teeth of common driving gear 32. The nature and construction of these conical involute teeth may be found in U.S. Patent No. 2,464,963 issued to Bregi et al. on March 22, 1949. A pair of tabs 75 are fixed to and extend in an axial direction from gear wheel 74.

Shaft 52 is threaded at 76 and receives a threaded collar 78 which is tightened towards sleeve 66. Immediately adjacent threads 76 of shaft 52 is a shoulder 79 against which a wheel 80 is bolted. Wheel 80 is keyed to shaft 52 by key 82 and has formed therein, corresponding to the placement of tabs 75, a pair of tab receiving slots 84. Entering each slot 84 from opposite sides are a pair of inwardly directed threaded adjustment bolts 86 which in the adjusted position bear against opposite sides of the tabs 75. It can be seen therefore that each shaft 52 may be rotated a slight amount relative the other shafts 52 by a loosening of one adjustment bolt 86 in each slot and a corresponding tightening of the opposite bolt 86.

In the operation of this embodiment, a workpiece 34 is secured on the main power shaft 28 and then spindle 38 is moved into engagement with shaft 28 and locked. The gear ratio between master gear 32 and conical involute gears 74 is determined so that the proper ratio between gear forming rolls 50 and workpiece gear 34 is provided.

At the beginning of the operation, drum 26 is in a leftward position so that rolls 50 have not yet engaged the workpiece 34. Power is supplied to motor 36 driving pulley 30 and shaft 28 with master gear 32 and workpiece 34 having the same rotative speeds. Gear wheels 74 are each driven by master gear 32 to drive their corresponding gear forming rolls 50. Feed wheel 46 is then turned either manually or through a feed drive (not shown), to move drum 26 in a rightward direction with rolls 50 engaging workpiece 34 to form gear teeth thereon having characteristics depending upon the configuration and inclination of the teeth of rolls 50 and the inclination of the teeth of master gear 32. The helix angles of and ratio between the teeth of gears 32 and 74 correspond with the helix angles of and ratio between the teeth on rolls 50 and the workpiece and gear 74 is moved along gear 32 at the same longitudinal rate that work gear 50 is moved along workpiece 34. Different helix angles may be formed on the workpiece by proper selection of gears 32 and 74 and rolls 50.

If it is found in operation that the gear rolls 50 are not acting uniformly on the workpiece 34, then the gear roll that is out of alignment may be adjusted axially through change of spacer 64, and circumferentially through adjustment of screws 86.

In FIGURES 3 to 6 is shown a second embodiment wherein the drum is revolved while the forming rolls are being rotated. In this embodiment a base 92 supports at either end in fixed relation stands 94 and 96 and intermediately a drum housing 98. Fixed to the upper end of stand 96 is a sun gear 100 and rotatively mounted in housing 98 is a drum 102 which is belt driven from motor 103 and has rotatively mounted therein a plurality of shafts 104 which are crossed in space. Shafts 104 are similar in construction to shafts 52 shown in FIGURES 1 and 2 and therefore will be only briefly described. Keyed to the end of each shaft 104 is a positioning wheel 106 which has formed therein a pair of slots 108, each of which has mounted in opposite walls inwardly extending adjustment bolts 110. Mounted for rotational movement on each shaft 104 is a gear wheel 112 having conical involute teeth enmeshed with sun gear 100 and having a pair of tabs 114 which extend in an axial direction therefrom into the slots 108 with tabs 114 being engaged on either side by bolts 110. Removably secured to the opposite ends of shafts 104 are gear forming rolls 116 which have gear forming teeth extending therefrom for engaging a workpiece blank.

Stand 94 supports a cylinder 122 which has internal helical grooves formed therein which are enmeshed with the external helical grooves of a lead bar 124. Removably secured to an inner end of bar 124 is the workpiece 126 which is movable centrally between gear forming rolls 116. The other end of lead bar 124 is recessed at 128 for receiving necked portion 130 of a threaded stem 132 having connected thereto a hand wheel 133. A latch bar 134 threadedly engages and vertically supports threaded stem 132 and is pivoted to one of a pair of spaced upstanding supports 136. Lifting of latch bar 134 will lift stem 132 and necked portion 130 upwardly from recess 128 disengaging stem 132 from lead bar 124.

Rotation of wheel 133 will axially advance stem 132, which advancement will be imparted to lead bar 124 through the connection between necked portion 130 and recess 128. Lead bar 124, and workpiece 126, will then be rotated depending upon the angle of the external and internal helical teeth on lead bar 124 and in cylinder 122 respectively, which inclination should agree with the inclination of the teeth of gear rolls 116 and will determine the degree of helix imparted to workpiece 126.

In the operation of this embodiment, latch bar 134 is pivoted to an open position and lead bar 124 is retracted at which time a workpiece 126 is secured to the end thereof. Lead bar 124 is then advanced to a point where workpiece 126 is short of engagement with the gear forming rolls 116. Then latch bar 134 is pivoted to a closed position engaging necked portion 130 with recess 128. With drum 102 being rotated by the belt drive from motor 103, the shafts 104 will be rotated due to the engagement between gears 114 and sun gear 100. The ratio between the teeth on gears 114 and sun gear 100 should agree with the ratio between the teeth of gears 116 and workpiece 126. Shaft 132 is then rotated by wheel 133 or a suitable drive means to axially advance lead bar 124 rightwardly so that workpiece 126 engages gear forming rolls 116. Due to the helical grooves on lead bar 124 and in cylinder 122, a predetermined rotational movement will be imparted to the axially advancing workpiece 126 to form thereon a corresponding gear tooth helix.

The degree of helix may be varied by proper selection of helix for lead bar 124 and gears 116 and, if desired, a spur gear could be formed by axially advancing the lead bar without rotating it, in which case, the teeth of gear forming rolls 116 would have to be inclined so as to be formed on their workpiece engaging sides in a line parallel to the workpiece axis.

After the workpiece 126 has been completely advanced through the gear forming rolls 116, it may be retracted and latch bar 134 pivoted upwardly to permit removal of the finished work gear blank and insertion of a fresh work gear blank.

Circumferential and axial adjustments may be made to gear rolls 116 in a manner similar to that for gear rolls 50 of the first described embodiment.

The drawings and the foregoing specification constitute a description of the improved gear rolling apparatus in such full, clear, concise and exact terms as to enable any person skilled in the art to practice the invention, the scope of which is indicated by the appended claims.

What we claim is:

1. Rolling apparatus comprising a base, a work support on said base, a rotatable work supporting shaft carried by said work support, a master gear replaceably secured to said work supporting shaft adjacent one end thereof for rotation therewith, means for removably securing a work gear to the other end of said shaft for rotation therewith, means operably associated with said shaft for producing rotation thereof, a carriage surrounding said work supporting shaft, means for producing movement of said carriage axially of said shaft independently of the rotation of said shaft, a plurality of independently rotatable roll supporting shafts journaled to said carriage, the axes of said roll supporting shafts being inclined in crossing relation to the axis of rotation of the work supporting shaft, said roll supporting shafts being disposed at uniform circumferential spacing about the axis of said work supporting shaft, means at one end of said roll supporting shafts for removably supporting and axially positioning work forming rolls in relation to the work gear, conical involute gears, means angularly adjustably securing said conical involute gears to the other end of the roll supporting shafts in mesh with the master gear for directly driving said roll supporting shafts in timed relation with the work supporting shaft.

2. Structure as claimed in claim 1 wherein the last mentioned means includes positioning wheels fixedly secured to the roll supporting shafts for rotation therewith, said gears are rotatable relative to said shafts, and means for effecting controlled rotation between said gears and wheels are provided.

3. Rolling apparatus comprising a base, a work support on said base, a work supporting shaft carried by said work support, means for supporting a master gear in axial alignment with and in spaced relation to said work supporting shaft, means for removably securing a work gear to one end of said shaft, a carriage coaxial with said work supporting shaft positioned between a work gear secured to said shaft and said master gear, means for producing relative movement between said shaft and carriage axially of said shaft, a plurality of independently rotatable roll supporting shafts journaled to said carriage, the axes of said roll supporting shafts being inclined in crossing relation to the axis of rotation of the work supporting shaft, said roll supporting shafts being disposed at uniform circumferential spacing about the axis of said work supporting shaft, means at one end of said roll supporting shafts for removably supporting and axially positioning work forming rolls in relation to the work gear, conical involute gears, means angularly adjustably securing said conical involute gears to the other end of the roll supporting shafts in mesh with the master gear for directly driving said roll supporting shafts on relative rotation between said master gear and carriage, and means for producing relative rotation between said master gear and carriage.

4. Rolling apparatus comprising a base, a pair of support members mounted on said base in spaced relation, an axially positionable work supporting shaft carried by one of said support members, means for axially moving the work supporting shaft, a master gear in axial alignment with said work supporting shaft supported on the other support member, a carriage support secured to said base between said support members, a carriage rotatably mounted in said carriage support coaxial with said work supporting shaft, a plurality of independently rotatable roll support shafts journaled to said carriage the axes of said roll supporting shafts being inclined in crossing relation to the axis of rotation of the work supporting shaft, said roll supporting shafts being disposed at uniform circumferential spacing about the axis of said work supporting shaft, means at one end of said roll supporting shafts for removably supporting and axially positioning work forming rolls in relation to a work gear supported on said work supporting shaft, conical involute gears, means angularly adjustably securing said conical involute gears to the other end of the roll supporting shafts in mesh with the master gear for directly driving said roll supporting shafts on rotation of said carriage, and means for rotating said carriage within said carriage support.

References Cited in the file of this patent

UNITED STATES PATENTS

| | | |
|---|---|---|
| 351,372 | Goddu | Oct. 26, 1886 |
| 360,428 | Goddu | Apr. 5, 1887 |
| 603,394 | Ashton | May 3, 1898 |
| 1,558,086 | Gustavsen | Oct. 20, 1925 |
| 1,568,648 | White | Jan. 5, 1926 |
| 1,891,831 | Okochi et al. | Dec. 20, 1932 |
| 2,114,690 | Sykes | Apr. 19, 1938 |
| 2,134,526 | McLaughlin | Oct. 25, 1938 |
| 2,282,193 | Lambrix | May 5, 1942 |
| 2,464,963 | Bregi et al. | Mar. 22, 1949 |
| 2,720,801 | Erdelyi et al. | Oct. 18, 1955 |
| 2,883,894 | Tsuchikawa | Apr. 28, 1959 |
| 2,901,932 | Erdelyi | Sept. 1, 1959 |
| 2,906,147 | Pelphrey | Sept. 29, 1959 |

FOREIGN PATENTS

| | | |
|---|---|---|
| 224,061 | Germany | July 22, 1910 |
| 306,092 | Germany | June 17, 1918 |
| 914,365 | Germany | July 1, 1954 |